United States Patent [19]

Mazurkiewicz et al.

[11] Patent Number: 5,749,072
[45] Date of Patent: May 5, 1998

[54] COMMUNICATIONS DEVICE RESPONSIVE TO SPOKEN COMMANDS AND METHODS OF USING SAME

[75] Inventors: Theodore Mazurkiewicz, Lake Zurich; Gil E. Levendel, Schaumburg; Shay-Ping Thomas Wang, Long Grove, all of Ill.

[73] Assignee: Motorola Inc., Schaumburg, Ill.

[21] Appl. No.: 579,714

[22] Filed: Dec. 28, 1995

Related U.S. Application Data

[63] Continuation-in-part of Ser. No. 253,893, Jun. 3, 1994, Pat. No. 5,509,103.

[51] Int. Cl.$^6$ .................................................. G10L 7/08
[52] U.S. Cl. .......................... 704/275; 704/245; 704/253
[58] Field of Search ............................. 395/2.41, 2.79, 395/2.84, 2.62, 2.6, 2.64, 2.63, 2.65, 2.66, 2.49; 704/275, 245, 270, 253, 255, 251, 254, 256, 257, 239, 240

[56] References Cited

U.S. PATENT DOCUMENTS

| | | | |
|---|---|---|---|
| 4,319,085 | 3/1982 | Welch et al. | 704/255 |
| 4,336,421 | 6/1982 | Welch et al. | 704/243 |
| 4,394,538 | 7/1983 | Warren et al. | 704/251 |
| 4,829,576 | 5/1989 | Porter | 704/235 |
| 5,365,592 | 11/1994 | Homer et al. | 395/2.42 |
| 5,384,892 | 1/1995 | Strong | 704/243 |
| 5,404,422 | 4/1995 | Sakamoto et al. | 395/2.41 |
| 5,408,586 | 4/1995 | Skeirick | 395/23 |
| 5,408,588 | 4/1995 | Ulug | 395/23 |
| 5,487,133 | 1/1996 | Park et al. | 395/27 |
| 5,509,103 | 4/1996 | Wang | 704/232 |
| 5,594,834 | 1/1997 | Wang | 395/2.62 |

OTHER PUBLICATIONS

"Handes Free Communication in an Automobile with a Microphone Array", OH, et al. ICASSP-92: 1992 IEEE International Conference on Acoustics, Speech and Signal Processing, Mar. 1992, vol. 1, pp. 281-284.

"Eyes Free Dialing For Cellular Telephones" Bendelac, et al. 17th Convention of Electrical and Electronics Engineers in Israel. Mar., 1991, pp. 234-237.

*Primary Examiner*—Allen R. MacDonald
*Assistant Examiner*—Richemond Dorvil
*Attorney, Agent, or Firm*—Michael K. Lindsey

[57] ABSTRACT

A communications device (20) that is responsive to voice commands is provided. The communications device (20) can be a two-way radio, cellular telephone, PDA, or pager. The communications device (20) includes an interface (22) for allowing a user to access a communications channel according a control signal and a speech-recognition system (24) for producing the control signal in response to a voice command. Included in the speech recognition system (24) are a feature extractor (26) and one or more classifiers (28) utilizing polynomial discriminant functions.

24 Claims, 2 Drawing Sheets

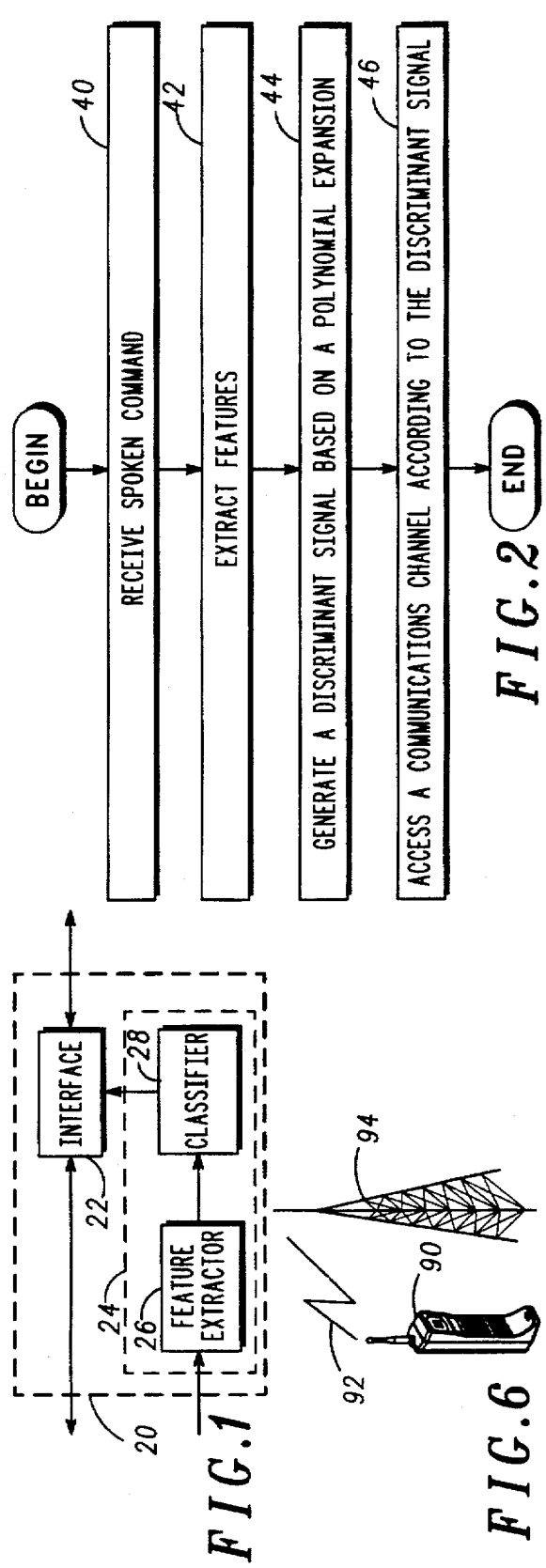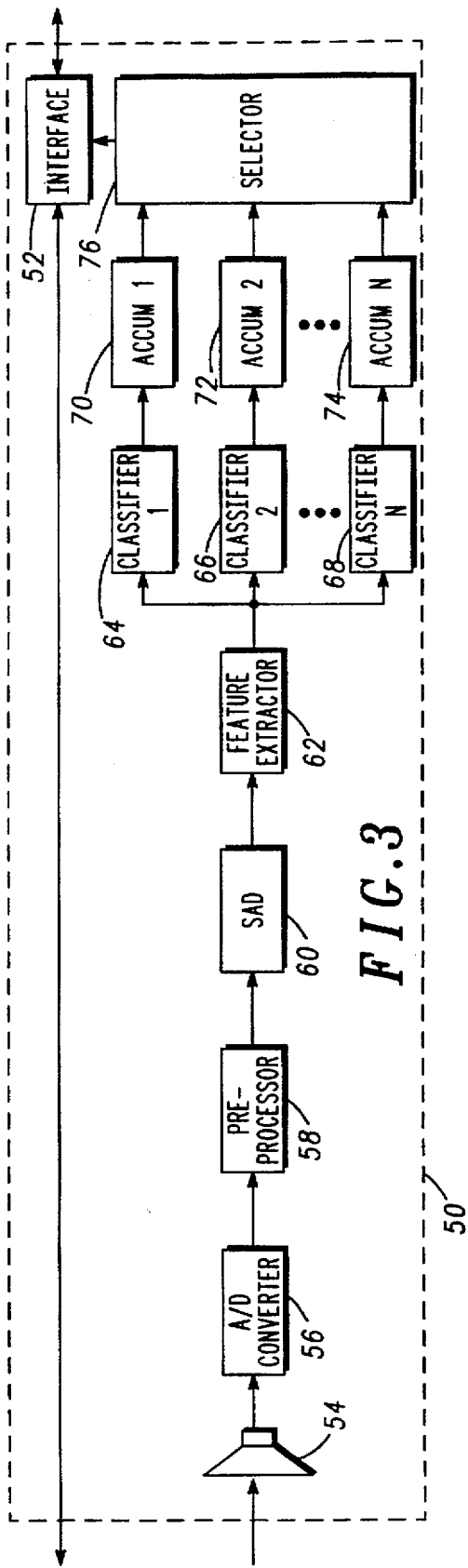

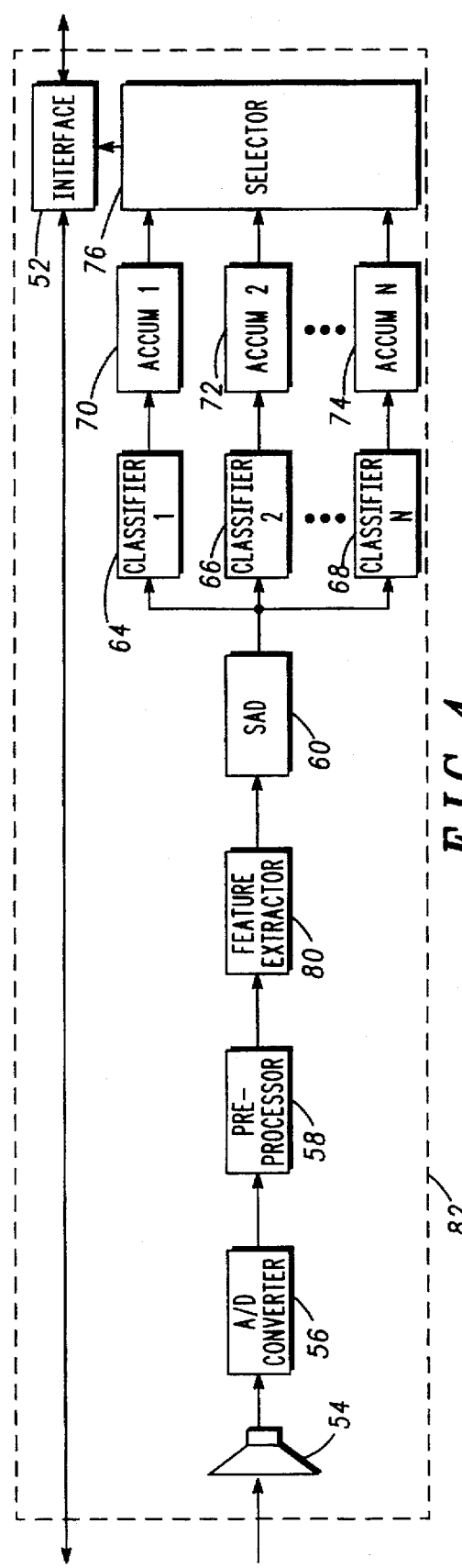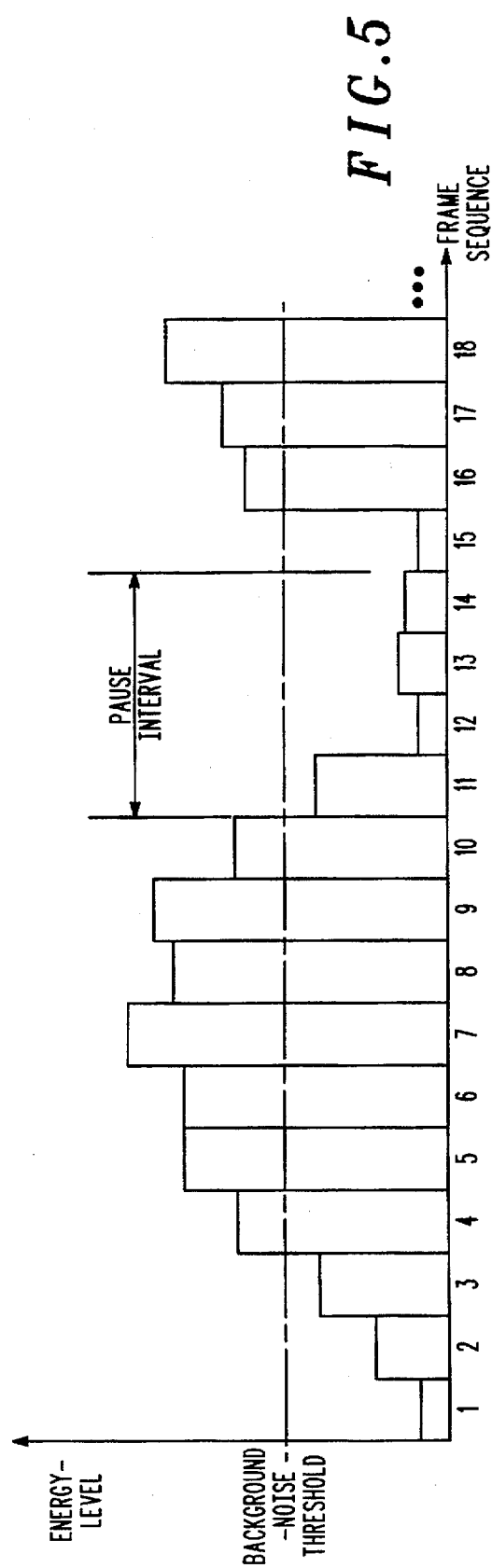

COMMUNICATIONS DEVICE RESPONSIVE TO SPOKEN COMMANDS AND METHODS OF USING SAME

This is a continuation-in-part of application Ser. No. 08/253,893, filed Jun. 3, 1994, U.S. Pat. No. 5,509,103, and assigned to the same assignee as the present invention. The above-listed application is incorporated herein by this reference.

TECHNICAL FIELD

The present invention relates generally to communications systems and, in particular, to a two-way communications device that is responsive to commands spoken by a user thereof.

BACKGROUND OF THE INVENTION

For many years, scientists have been trying to find a means to simplify the interface between man and machine. Input devices such as the keyboard, mouse, touch screen, and pen are currently the most commonly used tools for implementing a man/machine interface. However, a simpler and more natural interface between man and machine may be human speech. A device which automatically recognizes speech would provide such an interface.

Applications for automated speech-recognition include paging and two-way radio channel selection using voice commands, voice input for controlling a home appliance, such as a television or stereo, and a voice-dial cellular phone which would allow a driver to focus on the road while dialing.

Unfortunately, automated speech recognition is not a trivial task. One reason is that speech tends to vary considerably from one person to another. For instance, the same word uttered by several persons may sound significantly different due to differences in accent, speaking speed, gender, or age. In addition to speaker variability, co-articulation effects, speaking modes (shout/whisper), and background noise present enormous problems to speech-recognition devices.

Since the late 1960's, various methodologies have been introduced for automated speech recognition. While some methods are based on extended knowledge with corresponding heuristic strategies, others rely on speech databases and learning methodologies. The latter methods include dynamic time-warping (DTW) and hidden-Markov modeling (HMM). Both of these methods, as well as the use of time-delay neural networks (TDNN), are discussed below.

Dynamic time-warping is a technique which uses an optimization principle to minimize the errors between an unknown spoken word and a stored template of a known word. Reported data shows that the DTW technique is very robust and produces good recognition. However, the DTW technique is computationally intensive. Therefore, it is currently impractical to implement the DTW technique for real-world applications.

Instead of directly comparing an unknown spoken word to a template of a known word, the hidden-Markov modeling technique uses stochastic models for known words and compares the probability that the unknown word was generated by each model. When an unknown word is uttered, the HMM technique will check the sequence (or state) of the word, and find the model that provides the best match. The HMM technique has been successfully used in many commercial applications; however, the technique has many drawbacks. These drawbacks include an inability to differentiate acoustically similar words, a susceptibility to noise, and computational intensiveness.

Recently, neural networks have been used for problems that are highly unstructured and otherwise intractable, such as speech recognition. A time-delay neural network is a type of neural network which addresses the temporal effects of speech by adopting limited neuron connections. For limited word recognition, a TDNN shows slightly better results than the HMM method. However, a TDNN suffers from some serious drawbacks.

First, the training time for a TDNN is very lengthy, on the order of several weeks. Second, the training algorithm for a TDNN often converges to a local minimum, which is not the globally optimum solution.

In summary, the drawbacks of existing known methods of automated speech-recognition (e.g. algorithms requiring impractical amounts of computation, limited tolerance to speaker variability and background noise, excessive training time, etc.) severely limit the acceptance and proliferation of speech-recognition devices in many potential areas of utility. For example, currently available cellular phones and two-way radios that respond to spoken commands have unreliable speech recognition capabilities. Consequently, they frustrate users and have not been well received in the marketplace.

Thus, there exists a need for a communications device that incorporates an automated speech-recognition system providing a high level of accuracy, immunity to background noise, single epoch training, and insensitivity to differences in speakers.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 1 shows a block diagram of a communications device that is in accordance with one embodiment of the present invention.

FIG. 2 shows a flow diagram of the method of using the communications device of FIG. 1 in accordance with another embodiment of the present invention.

FIG. 3 shows a block diagram of a communications device that is in accordance with an further embodiment of the present invention.

FIG. 4 shows a block diagram of a communications device that is in accordance with an alternative embodiment of the present invention.

FIG. 5 shows a graphical representation of a frame sequence.

FIG. 6 illustrates a communications system that incorporates a communications device embodying the present invention.

DETAILED DESCRIPTION OF A PREFERRED EMBODIMENT

It is an advantage of the present invention to provide a communications device that allows a user to access a communications channel with a high degree of reliability using voice commands. It is also an advantage of the present invention to provide a communications device having a speech recognition system that does not require repetitive training and is insensitive to background noise and speaker variations. It is a further advantage of the present invention to provide a speech recognition system which is compactly implemented in software thus allowing it to be easily incorporated into a handheld radio or cellular phone. Another advantage of the present invention is that it provides a handheld communications device that incorporates a speech recognition system that reduces the amount of data buffering required.

FIG. 1 illustrates a block diagram representing a communications device which is in accordance with one embodiment of the present invention. The communications device 20 comprises an interface 22, and a speech recognition system 24. The speech recognition system includes a feature extractor 26 and a classifier 28.

The interface 22 allows a user to access a communications channel according to a control signal that is generated by the speech recognition system 24. The interface 22 can be any means for allowing a user to transfer electronic data via a communications channel. For example, the interface can be a two-way radio, a telephone, a personal digital assistant (PDA), or a pager. In these examples, the communications channel is a radio link between another device or a base station. However, the communications channel can comprise any medium, including, but not limited to fiber-optic, coaxial, and twisted-wire cable. The interface 22 can respond to various user inputs, such as keyboard input, voice commands, touch-screen, or mouse entry.

The speech recognition system 24 produces the control signal in response to a spoken command. The feature extractor 26 extracts a plurality of features from the spoken command. In turn, the classifier 28 generates a discriminate signal according to a polynomial expansion. The control signal received by the interface 22 is based on the discriminate signal.

The features extracted by the feature extractor 26 preferably include cepstral coefficients, first-order derivatives of cepstral coefficients, and word-level features, such as normalized energy and frame index. Word-level features are described with greater detail below in conjunction with FIG. 3.

In response to the features, the classifier 28 generates the discriminant signal according to a polynomial expansion represented by:

$$y = \sum_{i=0}^{m} w_i \left[ \prod_{j=0}^{n} x_j g_{ji} \right] \quad (1)$$

In Equation 1, $x_j$ represents the features; y represents the discriminant signal; $w_i$ represents a coefficient; $g_{ji}$ represents an exponent; and i, j, m and n are integers.

In a preferred embodiment of the present invention, the discriminant function is a second order polynomial expansion of the form:

$$y = a_0 + \sum_{i=0}^{n} b_i x_i + \sum_{i=0}^{n} \sum_{j=0}^{n} c_{ij} x_i x_j \quad (2)$$

In Equation 2, $a_0$ represents a zero-order coefficient, $b_i$ represents a first-order coefficient, and $c_{ij}$ represents a second-order coefficient, $x_i$ and $x_j$ represents the features, y represents the discriminant signal, and i, j, m and n are integers. There are preferable twenty features $x_0$–$x_{19}$, resulting in a second-order polynomial having 231 terms.

In various other embodiments of the present invention, the discriminant function can be based on an orthogonal function, such as a sine, cosine, exponential/logarithmic, Fourier transformation, Legendre polynomial, non-linear basis function such as a Volterra function or a radial basis function, or the like, or a combination of polynomial expansions and orthogonal functions.

In a preferred embodiment of the present invention, the polynomial discriminant function is fitted to a set of samples from a p-dimensional feature space representing input speech examples. If the number of terms in the polynomial is equal to the number of examples, a matrix-inversion technique may be employed to solve for the value of each coefficient. If the number of terms is not equal to the number of examples, a least-squares estimation technique is employed to solve for the value of each coefficient. Suitable least-squares estimation techniques include, for example, least-squares, extended least-squares, pseudo-inverse algorithm, Kalman filter, maximum-likelihood algorithm, Bayesian estimation, and the like.

Generally, the number of speech examples exceeds the number of polynomial terms; thus, a least squares technique is used to derive the coefficients. However, if the number of speech examples and terms is equal, the discriminant transfer function can be represented by the matrix equation Y=WZ, where Y represents a matrix of example discriminant signals, W represents a matrix of coefficients, and Z is a matrix representing the terms, which can be functions of the example inputs, such as exponential functions of derived features. The coefficient matrix is determined according to the equation $W=Z^{-1}Y$, where $Z^{-1}$ represents the inverse matrix of Z.

FIG. 2 shows a flow diagram of controlling a communications channel in accordance with another embodiment of the present invention. In box 40, a spoken command is received by the speech recognition system 24. In box 42, the features are extracted from the spoken command. In box 44, a discriminant signal based on a polynomial function of the form given by Equation (1) is generated. Next, in box 46, the communications channel is accessed according to the discriminate signal.

A spoken command can be any word, however, in a preferred embodiment of the present invention, the spoken command is selected from either a numerical digit between 0 and 9, or the words "help", "page", and "send". When spoken in a sequence, the digits can be identified to dial access codes, such as a phone number or particular radio channel, that will allow the user to communicate with other devices connected to the communications channel. The command "page" can delimit the beginning of a phone or radio channel number; while the command "send" can delimit the end of the number and cause the communications device 20 to transmit the number across the communication channel.

The command "help" can be used to broadcast an emergency signal across the communications channel. This feature provides significant advantage for emergency personnel such as police and firemen.

FIG. 3 shows a block diagram of a communications device which is in accordance with a further embodiment of the present invention. The communications device 50 includes an interface 52, a microphone 54, an A/D converter 56, a pre-processor 58, a speech activity detector (SAD) 60, a feature extractor 62, a plurality of classifiers 64–68, a plurality of accumulators 70–74, and a selector 76.

In a preferred embodiment of the present invention, the interface 52 is a two-way audio interface for transmitting and receiving data across a radio channel according to a control signal that is generated by the selector 76.

The control signal is generated in response to a spoken command by the user. The microphone 54 generates an audio signal in response to spoken command. The A/D converter 56 digitizes the audio signal by sampling at a predetermined rate. The sampling rate is preferably 8–10 KHz. In addition, the A/D converter 56 can include an anti-aliasing filter.

The pre-processor 58 conditions the digitized audio signal using signal processing techniques and transforms it into a sequence of data vectors which are ready for feature extraction. The pre-processor 58 can perform band shaping on the digitized audio signal. Band shaping adjusts the sampling rates to correspond with the processing rate required by the downstream elements, such as the classifiers and accumulators 64–74. In addition, the pre-processor 58 pre-emphasizes the digitized audio signal to equalize the spectral tilt inherent in the speech input. A first-order finite impulse response (FIR) filter can be used to pre-emphasize. Pre-emphasis provides increasing attenuation at DC values as its filter coefficient approaches unity. The pre-processor 58 can also apply a hamming function to each data vector to suppress unwanted spectral artifacts. In addition, auto-correlation can be performed over a block of data vectors to generate correlation signals included in the output data vectors. Linear predictive coding (LPC) coefficients are computed as functions of the correlation signals by the feature extractor 62. This reduces the input data bandwidth required by the feature extractor 62.

As a result of the processing described above, the pre-processor 58 generates a sequence of data vectors, which are also referred to as data frames. Preferably, each data frame represents a 20 milli-second interval of input speech. In various embodiments, the data frames can be temporally overlapped to provide more meaningful interpretation by the feature extractor 62 and classifiers 64–68.

The speech activity director (SAD) 60 produces a vector sub-sequence comprising only those of the data vectors representing the spoken command. Essentially, the SAD 60 separates data vectors representing actual speech from those containing background noise.

In a preferred embodiment of the present invention, this SAD 60 continuously receives the sequence of data vectors. The output vector sub-sequence includes only those of the input data vectors having an energy level that exceeds a background noise threshold. The energy values can be derived from data produced by the auto-correlation process of the pre-processor 58. The background noise threshold is determined from energy levels of data vectors known not to contain speech. The noise threshold is preferably the multiple of the average energy level over a finite number of speechless data vectors. When the energy level in a contiguous sequence of input vectors exceeds the background estimate, the start of a word has been detected. The required number of contiguous vectors is specified by a predetermined system parameter. Likewise, when a subsequent contiguous sequence of vectors falls below this estimate, the end of a word has been detected.

The feature extractor 62 extracts a sequence of feature frames from the vector sub-sequence generated by the SAD 60. Preferably, the feature frames include cepstral coefficients and first-order derivatives of the cepstral co-efficients. A preferred feature frame includes ten first-order derivatives and 10 cepstral coefficients extracted from a corresponding data vector.

In addition, the feature frames can also include word-level features, such as normalized energy and frame indexes. The normalized energy of a vector sub-sequence can be derived from the output of the auto-correlation process of the pre-processor 58. The frame index is an integer indicating the relative position of data vector (data frame) in a vector sub-sequence.

Cepstral analysis, which is performed on the vector sub-sequence to yield the cepstral coefficients, results in a representation of the speech signal which characterizes the relevant features of the continuous speech. It can be regarded as a data reduction procedure that retains vital characteristics of the speech signal and eliminates undesirable interference from irrelevant characteristics of the speech signal, thus easing the decision-making process of the classifiers 64–68.

The cepstral analysis is performed as follows. First, a p-th order (preferably p=8 to 10) linear prediction analysis is applied to the vector sub-sequence to yield p prediction coefficients. The Levinson-Durbin recursion is preferably used to perform this analysis. The prediction coefficients are then converted into cepstrum coefficients using the following recursion formula:

$$c(n) = a(n) + \sum_{k=1}^{n-1} (1 - k/n)a(k)c(n-k) \quad (3)$$

In Equation (3), c(n) represents the $n^{th}$ cepstrum coefficient, a(n) represents the $n^{th}$ prediction coefficient, $1 \leq n \leq p$, p is equal to the number of cepstrum coefficients, n represents an integer index, k represents an integer index, and a(k) represents the $k^{th}$ prediction coefficient and c(n–k) represents the $(n-k)^{th}$ cepstrum coefficient.

It will be understood by one of ordinary skill in the art that Equation (3) does not necessarily limit the number of cepstral coefficients to the number of LPC coefficients and that the number of cepstral coefficients can in fact exceed the number of LPC coefficients.

The first-order derivatives of the cepstral coefficients can be estimated based on the differences between cesptral coefficients from temporally adjacent data vectors. However, this technique results in noisy estimates. The first-order derivatives are preferably estimated using a second-order polynomial which has fitted using regression to the cepstral coefficients of a predetermined number consecutive data vectors. Additional sets of features can be generated from higher order derivatives.

The features frames are distributed to the plurality of classifiers 64–68. Any number of classifiers can be used to recognize the spoken commands. Typically, each of the classifiers designates a different spoken command and generates a discriminate signal according to a second order polynomial expansion, such as the depicted by Equation (2). The outputs of the classifiers 64–68 are accumulated their corresponding accumulators 70–74. Each accumulator sums the outputs of a respective classifier. This results in the generation of a plurality of accumulated discriminate signals corresponding to each class. Accumulated discriminate signals are passed to the selector 76.

The selector 76 selects a largest accumulated discriminate signal and generates the control signal accordingly. The control signal is a function of the largest accumulated discriminate signal.

In response to a spoken command, the communications device 50 will configure the interface 52 to allow the user to access the communications channel in different ways. For example, when the command "help" is received by the communications device 50, the interface 52 will automatically generate an emergency broadcast signal onto the communications channel. Additionally, the spoken commands can be combined sequentially to produce various configurations of the interface 52.

FIG. 4 shows a block diagram of a communications device 82 in accordance with an alternative embodiment of the present invention. The communications device 82 shown in FIG. 4 includes the elements 52–76 described in conjunction with FIG. 3. However, in contrast to previously described communications device 50, the communications device 82 of FIG. 4 includes a modified feature extractor 80.

In this embodiment of the present invention, the modified feature extractor 80 precedes the SAD 60. This is possible because word-level features are not extracted by the modified feature extractor 80. Placing the feature extractor 80 before the SAD 60 provides advantage in that it reduces the amount of buffering required by the communications device 82, consequently reducing the overall memory space required by a the speech recognition system.

With the exception of word-level feature extraction, the modified feature extractor 80 performs essentially the same functions as described for the feature extractor 62 of FIG. 3.

FIG. 5 shows a graph of the energy levels of a data frame sequence. Energy levels of the frames are determined by the auto correlation feature of the pre-processor 58. The X-axis of the graph indicates the time-ordering of the frame sequence, while the Y-axis indicates the energy levels of the frames. The background noise threshold is also indicated on the Y-axis.

The SAD 60 detects boundaries of a spoken command by determining energy-level transitions across the background noise threshold.

In a preferred embodiment of the present invention, the SAD 60 associates a beginning-of word-boundary with a positive energy-level transition that is followed by a predetermined interval of data vectors having energy levels exceeding the threshold. Conversely, the SAD 60 associates an end-of-word boundary with a negative energy-level transition that is followed by vector energy levels remaining below the noise threshold for a subsequent pause interval.

In real-time acquisition of spoken commands, a speech recognition system should be capable of accepting spoken commands that have energy contours that temporarily dip below the noise threshold. By accounting for variations in the energy levels following a transition, the SAD 60 significantly enhances the accuracy of the speech recognition system because it is less likely to falsely detect an end-of-word boundary.

In the example shown, frame 4 represents the first frame of a spoken command. The end-of-word is detected when the energy level of a frame subsequently falls below the threshold. In this case, frame 10 represents the last frame of the spoken command.

The pause interval should not be too short as to falsely trigger an end-of-word detection, yet not too long as to require an unduly long pause between spoken commands.

FIG. 6 illustrates a communications system which can incorporate a communications device embodying the present invention. The communications system includes a communications device 90, a communications link 92 and a base station 94. The communications device 90 includes one of the various embodiments of the present invention, such as any of those shown in FIGS. 1, 3, and 4. The communications link can be a radio link, while the base station 94 can be a cell site or a radio base station. The communications device 90 can be used to pass data to other communications devices (not shown) that are similarly link to the base station 94.

In summary, there has been described herein a concept, as well as a preferred embodiment, of a communications device and method which may be used to access a communication channel according to spoken commands. Because the various embodiment of the communications device as hereindescribed utilize polynomial discriminant functions, they are insensitive to user variations, thus allowing a high degree of reliability. Since the polynomial discriminant functions are fitted to example spaces using a least squares estimation or matrix-inversion technique, repetitive training of the classifiers is not required.

While specific embodiments of the present invention have been shown and described, it will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A communications device, comprising:
    an interface for allowing a user to access a communications channel according a control signal; and
    a speech-recognition system for producing the control signal in response to a spoken command, the speech-recognition system including:
    a feature extractor for extracting a plurality of features from the spoken command; and
    a classifier for generating a discriminant signal according to a polynomial expansion having a form $$y = \sum_{i=0}^{m} w_i \left[ \prod_{j=0}^{n} x_j^{g_{ji}} \right];$$

wherein $x_j$ represents the plurality of features, y represents the discriminant signal, $w_i$ represents a coefficient, $g_{ji}$ represents an exponent, and i, j, m and n are integers; wherein the control signal is based on the discriminant signal.

2. The communications device of claim 1, wherein the polynomial expansion has a form $$y = a_0 + \sum_{i=0}^{n} b_i x_i + \sum_{i=0}^{n} \sum_{j=0}^{n} c_{ij} x_i x_j;$$

wherein $a_0$ represents a zero-order coefficient, $b_i$ represents a first-order coefficient, and $c_{ij}$ represents a second-order coefficient.

3. The communications device of claim 1, wherein the interface includes a device selected from a group consisting of: a two-way radio, a telephone, a PDA, and a pager.

4. The communications device of claim 1, wherein the spoken command is a word selected from a group consisting of a digit between 0–9, "page", "send", and "help".

5. The communications device of claim 1, wherein the speech-recognition system further comprises:
    a pre-processor, operatively associated with the feature extractor, for transforming an audio signal using signal processing techniques into a sequence of data vectors that represent the spoken command and from which the plurality of features are extracted.

6. The communications device of claim 1, wherein the plurality of features are selected from a group consisting of:

cepstral coefficients, first-order derivatives of cepstral coefficients, and word-level features.

7. A communications device, comprising:

a pre-processor for transforming an audio signal into a sequence of data vectors;

extraction means for extracting a plurality of feature frames from the sequence of data vectors;

a plurality of classifiers for generating a plurality of discriminant signals, each of the plurality of classifiers designating a different spoken command and generating a discriminant signal according to a polynomial expansion having a form $$y = \sum_{i=0}^{m} w_i \left[ \prod_{j=0}^{n} x_j g_{ji} \right];$$

wherein $x_j$ represents a feature frame, y represents the discriminant signal, $w_i$ represents a coefficient, $g_{ji}$ represents an exponent, and i, j, m and n are integers;

an accumulator for generating a plurality of accumulated discriminant signals, the accumulator generating each of the plurality of accumulated discriminant signals by summing ones of the plurality of discriminant signals produced by a respective one of the plurality of classifiers;

a selector for selecting a largest accumulated discriminant signal from the plurality of accumulated discriminant signals; and a two-way audio interface for transmitting and receiving data across a communications channel according a control signal, the control signal being a function of the largest accumulated discriminant signal.

8. The communications device of claim 7, wherein the extraction means includes:

a feature extractor for extracting a sequence of feature frames from the sequence of data vectors; and a speech activity detector for selecting from the sequence of feature frames the plurality of feature frames representing a spoken command.

9. The communications device of claim 7, wherein the extraction means includes:

a speech activity detector for selecting from the sequence of data vectors a vector sub-sequence representing a spoken command; and a feature extractor for extracting a plurality of feature frames from the vector sub-sequence.

10. The communications device of claim 7, wherein the polynomial expansion has a form $$y = a_0 + \sum_{i=0}^{n} b_i x_i + \sum_{i=0}^{n} \sum_{j=0}^{n} c_{ij} x_i x_j;$$

wherein $a_0$ represents a zero-order coefficient, $b_i$ represents a first-order coefficient, and $c_{ij}$ represents a second-order coefficient.

11. The communications device of claim 7, wherein the two-way audio interface includes a device selected from a group consisting of: a two-way radio, a telephone, a PDA, and a pager.

12. The communications device of claim 7, wherein the audio signal represents a spoken command selected from a group consisting of a digit between 0–9, "page", "send", and "help".

13. The communications device of claim 7, wherein each of the plurality of feature frames includes a plurality of features selected from a group consisting of: cepstral coefficients, first-order derivatives of cepstral coefficients, and word-level features.

14. A two-way handheld communications device, comprising:

a microphone for generating an audio signal;

an A/D converter for digitizing the audio signal to produce a digitized audio signal;

a pre-processor for transforming the digitized audio signal into a sequence of data vectors;

a speech activity detector for producing a vector sub-sequence representing a spoken command, the speech activity detector continuously receiving the sequence of data vectors and including in the vector sub-sequence those of the sequence of data vectors having an energy-level that exceeds a background noise threshold;

a feature extractor for extracting a sequence of feature frames from the vector sub-sequence;

a plurality of classifiers for generating a plurality of discriminant signals, each of the plurality of classifiers designating a different spoken command and generating a discriminant signal according to a polynomial expansion having a form $$y = \sum_{i=0}^{m} w_i \left[ \prod_{j=0}^{n} x_j g_{ji} \right];$$

wherein $x_j$ represents a feature frame, y represents the discriminant signal, $w_i$ represents a coefficient, $g_{ji}$ represents an exponent, and i, j, m and n are integers;

a plurality of accumulators for generating a plurality of accumulated discriminant signals, each of the accumulators summing ones of the plurality of discriminant signals produced by a respective one of the plurality of classifiers;

a selector for selecting a largest accumulated discriminant signal from the plurality of accumulated discriminant signals; and a two-way audio interface for transmitting and receiving data across a radio channel according a control signal, the control signal being a function of the largest accumulated discriminant signal.

15. The two-way handheld communications device of claim 14, wherein the polynomial expansion has a form $$y = a_0 + \sum_{i=0}^{n} b_i x_i + \sum_{i=0}^{n} \sum_{j=0}^{n} c_{ij} x_i x_j;$$

wherein $a_0$ represents a zero-order coefficient, $b_i$ represents a first-order coefficient, and $c_{ij}$ represents a second-order coefficient.

16. The two-way handheld communications device of claim 14, wherein the two-way audio interface includes a device selected from a group consisting of: a two-way radio, a telephone, a PDA, and a pager.

17. The two-way handheld communications device of claim 14, wherein the spoken command is a word selected from a group consisting of a digit between 0–9, "page", "send", and "help".

18. The two-way handheld communications device of claim 14, wherein the speech activity detector detects boundaries of the spoken command by determining energy-level transitions across the background noise threshold.

19. The two-way handheld communications device of claim 18, wherein the speech activity detector associates an 20. A method for controlling access to a communications channel, comprising the following steps:

receiving a spoken command;

extracting a plurality of features from the spoken command;

generating a discriminant signal based on a polynomial expansion having a form $$y = \sum_{i=0}^{m} w_i \left[ \prod_{j=0}^{n} x_j g_{ji} \right];$$

wherein $x_j$ represents the plurality of features, y represents the discriminant signal, $w_i$ represents a coefficient, $g_{ji}$ represents an exponent, and i, j, m and n are integers; and accessing the communications channel according the discriminant signal.

21. The method of claim 20, wherein the step of generating includes the following sub-step:

basing the discriminant signal on a second-order polynomial expansion having a form $$y = a_0 + \sum_{i=0}^{n} b_i x_i + \sum_{i=0}^{n} \sum_{j=0}^{n} c_{ij} x_i x_j;$$

wherein $a_0$ represents a zero-order coefficient, $b_i$ represents a first-order coefficient, and $c_{ij}$ represents a second-order coefficient.

22. The method of claim 20, further comprising the following step:

selecting the spoken command from a group consisting of a digit between 0–9, "page", "send", and "help".

23. The method of claim 20, further comprising the step of:

transforming an audio signal using signal processing techniques into a sequence of data vectors that represent the spoken command and from which the plurality of features are extracted.

24. The method of claim 20, wherein the step of extracting includes the following sub-step:

generating the plurality of features selected from a group consisting of: cepstral coefficients, first-order derivatives of cepstral coefficients, and word-level features.

* * * * *